(12) United States Patent
Joshi et al.

(10) Patent No.: US 10,042,521 B1
(45) Date of Patent: Aug. 7, 2018

(54) EMULATION OF CONTROL RESOURCES FOR USE WITH CONVERTED CONTENT PAGES

(71) Applicant: Amazon Technologies, Inc., Reno, NV (US)

(72) Inventors: Nikhil Dinkar Joshi, Seattle, WA (US); Aakarsh Nair, Redmond, WA (US); Kamlesh Nanda, Bothell, WA (US); Sajeeva Lakmal Bandara Pallemulle, Woodinville, WA (US); Ameet Nirmal Vaswani, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 469 days.

(21) Appl. No.: 14/285,317

(22) Filed: May 22, 2014

(51) Int. Cl.
*G06F 17/30* (2006.01)
*G06F 3/0484* (2013.01)
*H04M 1/725* (2006.01)

(52) U.S. Cl.
CPC ...... *G06F 3/0484* (2013.01); *G06F 17/30899* (2013.01); *G06F 17/30905* (2013.01); *H04M 1/72561* (2013.01)

(58) Field of Classification Search
CPC ........ G06F 17/30899; G06F 17/30905; H04M 1/72561
See application file for complete search history.

(56) References Cited

U.S. PATENT DOCUMENTS

| | | | |
|---|---|---|---|
| 5,930,472 A | 7/1999 | Smith | |
| 5,978,842 A | 11/1999 | Noble et al. | |
| 6,230,168 B1 | 5/2001 | Unger et al. | |
| 6,271,840 B1 | 8/2001 | Finseth et al. | |
| 6,356,908 B1 | 3/2002 | Brown et al. | |
| 6,657,647 B1 | 12/2003 | Bright | |
| 7,051,084 B1 | 5/2006 | Hayton et al. | |
| 7,191,211 B2 | 3/2007 | Tuli | |
| 7,296,230 B2 | 11/2007 | Fukatsu et al. | |

(Continued)

OTHER PUBLICATIONS

International Search Report and Written Opinion in PCT Application No. PCT/US2013/069733, dated Jun. 30, 2014.

(Continued)

*Primary Examiner* — Shen Shiau

(74) *Attorney, Agent, or Firm* — Knobbe, Martens, Olson & Bear, LLP

(57) ABSTRACT

A user device that presents a static non-interactive graphical representation of a content page received from an intermediary system may emulate controls or interactive elements included in the content page based on control metadata received from the intermediary system. The emulated controls enable the user device to restore the interactivity that is lost by generating the graphical representation of the content page. Further, the emulated controls may be included as part of an overlay layer positioned above the graphical representation of the content page. Information or control metadata for each control included in the content page may be provided to the user device with the graphical representation of the content page. The user device may use the control metadata to identify types of controls to emulate and where to position the emulated control with respect to the graphical representation of the content page.

24 Claims, 7 Drawing Sheets

(56) References Cited

U.S. PATENT DOCUMENTS

| | | |
|---|---|---|
| 7,310,769 B1 | 12/2007 | Dash |
| 7,356,570 B1 | 4/2008 | Tuli |
| 7,499,051 B1 | 3/2009 | O'Donnell |
| 7,917,618 B1 | 3/2011 | Bettis et al. |
| 8,103,742 B1 | 1/2012 | Green |
| 8,234,392 B2 | 7/2012 | Graffagnino et al. |
| 8,314,809 B1 | 11/2012 | Grabowski et al. |
| 8,331,566 B1 | 12/2012 | Foote et al. |
| 8,365,144 B1 | 1/2013 | Webb |
| 8,539,338 B2 | 9/2013 | Zhu et al. |
| 8,610,725 B2 | 12/2013 | Sandmel et al. |
| 8,732,571 B2 | 5/2014 | Jain et al. |
| 8,769,052 B1 | 7/2014 | Tidd |
| 8,913,067 B1 | 12/2014 | Kokkevis |
| 8,913,068 B1 | 12/2014 | Kokkevis |
| 8,990,674 B2 | 3/2015 | Shibukawa et al. |
| 9,454,515 B1 | 9/2016 | Jain |
| 9,563,928 B1 | 2/2017 | Sokolowski et al. |
| 9,563,929 B1 | 2/2017 | Sokolowski et al. |
| 9,720,888 B1 | 8/2017 | Jain et al. |
| 2001/0038395 A1 | 8/2001 | Holtzblatt |
| 2001/0032238 A1 | 10/2001 | Cronin, III et al. |
| 2002/0015042 A1* | 2/2002 | Robotham ............... G06F 3/14 345/581 |
| 2002/0091738 A1 | 7/2002 | Rohrabaugh |
| 2002/0170053 A1 | 11/2002 | Peterka et al. |
| 2003/0014478 A1 | 1/2003 | Noble |
| 2003/0158916 A1 | 8/2003 | Cronin, III et al. |
| 2003/0200507 A1 | 10/2003 | Stern et al. |
| 2004/0135784 A1 | 7/2004 | Cohen et al. |
| 2004/0186861 A1 | 9/2004 | Phatak |
| 2004/0239681 A1 | 12/2004 | Robotham et al. |
| 2005/0232227 A1 | 10/2005 | Jorgenson et al. |
| 2005/0243097 A1 | 11/2005 | Cohen et al. |
| 2005/0256836 A1 | 11/2005 | Awamoto et al. |
| 2007/0150820 A1* | 6/2007 | Salvo ...................... G06F 8/38 715/760 |
| 2007/0156972 A1 | 7/2007 | Uehara |
| 2007/0263007 A1 | 11/2007 | Robotham et al. |
| 2007/0271288 A1 | 11/2007 | Martin et al. |
| 2007/0288841 A1 | 12/2007 | Rohrabaugh et al. |
| 2008/0018658 A1 | 1/2008 | Bruno et al. |
| 2008/0034292 A1 | 2/2008 | Brunner |
| 2008/0055623 A1 | 3/2008 | Piersol et al. |
| 2008/0077862 A1 | 3/2008 | Tolpin |
| 2008/0120393 A1* | 5/2008 | Chen ............... G06F 17/30905 709/217 |
| 2008/0120626 A1 | 5/2008 | Graffagnino et al. |
| 2008/0222273 A1* | 9/2008 | Lakshmanan ..... G06F 17/30247 709/219 |
| 2008/0229025 A1 | 9/2008 | Plamondon |
| 2008/0235594 A1 | 9/2008 | Bhumkar et al. |
| 2008/0295164 A1 | 11/2008 | Steiner et al. |
| 2009/0002381 A1 | 1/2009 | Harper et al. |
| 2009/0030976 A1 | 1/2009 | Shukla |
| 2009/0033986 A1 | 2/2009 | Himpe |
| 2009/0089448 A1 | 4/2009 | Sze et al. |
| 2009/0100356 A1 | 4/2009 | Kujda |
| 2009/0125799 A1 | 5/2009 | Kirby |
| 2009/0158141 A1 | 6/2009 | Bauchot et al. |
| 2009/0177996 A1 | 7/2009 | Hunt et al. |
| 2009/0189890 A1 | 7/2009 | Corbett et al. |
| 2009/0228782 A1 | 9/2009 | Fraser |
| 2009/0238279 A1 | 9/2009 | Tu |
| 2009/0307571 A1 | 12/2009 | Gowda et al. |
| 2009/0307603 A1 | 12/2009 | Gowda et al. |
| 2010/0194753 A1 | 8/2010 | Robotham et al. |
| 2010/0269152 A1 | 10/2010 | Pahlavan et al. |
| 2011/0016403 A1* | 1/2011 | Shibukawa ....... G06F 17/30899 715/738 |
| 2011/0078333 A1 | 3/2011 | Jakubowski |
| 2011/0078593 A1* | 3/2011 | Matsui ................. G06F 3/0238 715/760 |
| 2011/0145695 A1* | 6/2011 | Matsui .............. G06F 17/30905 715/234 |
| 2011/0197126 A1 | 8/2011 | Arastafar |
| 2011/0225520 A1* | 9/2011 | Watanabe ......... G06F 17/30905 715/760 |
| 2011/0231746 A1 | 9/2011 | Rohrabaugh et al. |
| 2011/0287750 A1* | 11/2011 | Watanabe ......... G06F 17/30905 455/414.3 |
| 2012/0022942 A1 | 1/2012 | Holloway et al. |
| 2012/0030560 A1* | 2/2012 | Yano ................. G06F 17/30905 715/234 |
| 2012/0054166 A1 | 3/2012 | Jeremias |
| 2012/0084663 A1 | 4/2012 | Momchilov et al. |
| 2012/0102416 A1 | 4/2012 | Chmiel |
| 2012/0110435 A1 | 5/2012 | Green |
| 2012/0117145 A1 | 5/2012 | Clift et al. |
| 2012/0151094 A1 | 6/2012 | Cooke |
| 2012/0151308 A1 | 6/2012 | Falkenberg |
| 2012/0159308 A1 | 6/2012 | Tseng et al. |
| 2012/0188280 A1 | 7/2012 | Charlesbois et al. |
| 2012/0215834 A1 | 8/2012 | Chen et al. |
| 2012/0254727 A1 | 10/2012 | Jain et al. |
| 2012/0265802 A1 | 10/2012 | Shen et al. |
| 2013/0050249 A1 | 2/2013 | Grabowski et al. |
| 2013/0080895 A1 | 3/2013 | Rossman |
| 2013/0145259 A1 | 6/2013 | Kiefer, III et al. |
| 2013/0159923 A1 | 6/2013 | French et al. |
| 2013/0185633 A1 | 7/2013 | Bunker et al. |
| 2013/0212462 A1 | 8/2013 | Athas |
| 2014/0012685 A1 | 1/2014 | Le Chevalier |
| 2014/0053054 A1 | 2/2014 | Shen |
| 2014/0059421 A1 | 2/2014 | Chibisov et al. |
| 2014/0129920 A1 | 5/2014 | Sheretov et al. |
| 2014/0136942 A1 | 5/2014 | Kumar et al. |
| 2014/0136951 A1 | 5/2014 | Kumar et al. |
| 2014/0136971 A1 | 5/2014 | Kumar et al. |
| 2014/0136973 A1 | 5/2014 | Kumar et al. |
| 2014/0281896 A1 | 9/2014 | Wiitala et al. |
| 2015/0026566 A1 | 1/2015 | Hui et al. |
| 2015/0089355 A1 | 3/2015 | Peng et al. |
| 2015/0121193 A1 | 4/2015 | Beveridge et al. |
| 2015/0193409 A1* | 7/2015 | Portnoy ................. G06F 17/24 715/202 |
| 2015/0242522 A1* | 8/2015 | Lin .................. G06F 17/30882 715/205 |
| 2015/0271188 A1 | 9/2015 | Call |
| 2015/0293929 A1 | 10/2015 | Namgung |
| 2017/0011017 A1 | 1/2017 | Jain |

OTHER PUBLICATIONS

Kokkevis, Vangelis "GPU Accelerated Compositing in Chrome" The Chromium Projects, 2012, 9 pages.

Anonymous, "ShrinkTheWeb (STW) Website Previews Plugin", http://web.archive.org/web/20120710154658/http://wordpress.org/extend/plugins/shrinktheweb-website-preview-plugin/screenshots/, Jul. 10, 2012, 3 pages.

Anonymous, "ShrinkTheWeb—Website Previews API Documentation", http://web.archive.org/web/20121029152521/http://www.shrinktheweb.com/uploads/STW_API_Documentation.pdf, Oct. 29, 2012, 4 pages.

Esteveo, Martin, "Tiling in DirectX: Part 1", from gamedev.net, Jul. 24, 2000, 5pgs.

Esteveo, Martin, "Tiling in OpenGL", from gamedev.net, Dec. 12, 2000, 6 pgs.

PCWorld, Hands-on: Chrome Remote Desktop app for Android makes remote PC access easy, available at http://www.pcworld.com/article/2144562/hands-on-chrome-remote-desktop-app-for-android-makes-remote-access-easy.html, published Apr. 16, 2014 (last accessed May 22, 2014), 4 pages.

Microsoft Windows Help, Connect to another computer using Remote Desktop Connection, available at http://windows.microsoft.com/en-us/windows/connect-using-remote-desktop-connection#connect-using-remote-desktop-connection=windows-7 (last accessed May 22, 2014), 2 pages.

(56) References Cited

OTHER PUBLICATIONS

Bahl et al., "Advancing the State of Mobile Cloud Computing", MCS' 12, Jun. 25, 2012, pp. 21-27.

Björk et al., "WEST: A Web Browser for Small Terminals", CHI Letters, 1999, vol. 1, No. 1, pp. 187-196.

Buyukkokten et al., "Power Browser: Efficient Web Browsing for PDAs", CHI Letters, 2000, vol. 2, No. 1, Apr. 1-6, 2000, pp. 430-437.

Deboosere et al., "Thin Client Computing Solutions in Low- and High-Motion Scenarios", Third International Conference on Networking and Services (ICNS'07), 2007, pp. 6.

Delwadia, Vipul, "RemoteME: Experiments in Thin-Client Mobile Computing", Thesis for Master of Science in Computer Science, Victoria University of Wellington, 2009, pp. 114.

Dyken et al., "A Framework for OpenGL Client-Server Rendering", 2012 IEEE 4th International Conference on Cloud Computing Technology and Science, 2012, pp. 729-734.

Fox et al., "Experience With Top Gun Wingman: A Proxy-Based Graphical Web Browser for the 3Com PalmPilot", Middleware'98, Session 9, 1998, pp. 407-424.

Freytag et al., "Resource Adaptive WWW Access for Mobile Applications", Computers & Graphics, 1999, vol. 23, pp. 841-848.

Han et al., "Dynamic Adaptation in an Image Transcoding Proxy for Mobile Web Browsing", IEEE Personal Communications, Dec. 1998, pp. 8-17.

Ku et al., "The Amazon Kindle Fire: Benchmarked, Tested, and Reviewed", http://www.tomshardware.com/reviews/amazon-kindle-fire-review.3076.html, Nov. 23, 2011, pp. 37.

Stokes, Jon, "Amazon's Silk is More Than Just a Browser: It's a Cloud OS for the Client", http://web.archive.org/web/20121217033708/http://www.wired.com/insights/2011/09/amazon-silk, Sep. 28, 2011, pp. 4.

Tendulkar et al., "Abusing Cloud-Based Browsers for Fun and Profit", ACSAC '12, Dec. 3-7, 2012, pp. 219-228.

Wang et al., "Accelerating the Mobile Web with Selective Offloading", MCC' 13, Aug. 12, 2013, pp. 45-50.

Weintraub, Levi, "How WebKit Renders the Web", Fluent Conference, May 31, 2012, pp. 67. http://www.slideshare.net/naseemh/airbnb-tech-talk.

Xiao et al., "Browsing on Small Displays by Transforming Web Pages into Hierarchically Structured Subpages", ACM Transactions on the Web, Jan. 2009, vol. 3, No. 1, pp. 36.

Zavou et al., "Exploiting Split Browsers for Efficiently Protecting User Data", CCSW' 12, Oct. 19, 2012, pp. 37-42.

Garsiel, T., and P. Irish, How Browsers Work: Behind the Scenes of Modern Web Browsers, http://www.html5rocks.com/en/tutorials/internals/howbrowserswork/, Aug. 5, 2011, 52 pages.

Grosskurth, A., and M.W. Godfrey, Architecture and Evolution of the Modern Web Browser, http://grosskurth.ca/papers/browser-archevol-20060619.pdf, Jun. 20, 2006, 24 pages.

Jaquez, V., Herostratus' Legacy: Words From a Lazy Coder, Composited Video Support in WebKitGTK+, https://blogs.igalia.com/vjaquez/2013/07/26/composited-video-support-in-webkitgtk/, Jul. 26, 2013, 8 pages.

Stefanov, S., Rendering: Repaint, Reflow/Relayout, Restyle, http://www.phpied.com/rendering-repaint-reflowrelayout-restyle/, Dec. 17, 2009, 11 pages.

Wiltzius, T., Accelerated Rendering in Chrome: The Layer Model, http://www.html5rocks.com/en/tutorials/speed/layers/, Mar. 11, 2013, 11 pages.

Xiao, Y., et al., Web Page Adaptation for Small Screen Mobile Device: A New P2P Collaborative Deployment Approach, First International Conference on Intelligent Networks and Intelligent Systems, 2008, pp. 191-196.

\* cited by examiner

EMULATION OF CONTROL RESOURCES FOR USE WITH CONVERTED CONTENT PAGES

CROSS-REFERENCE TO CONCURRENTLY-FILED APPLICATIONS

The present application's Applicant is concurrently filing the following U.S. patent applications on May 22, 2014:

| U.S. application Ser. No. | Title |
|---|---|
| 14/285,492 | DELIVERY AND DISPLAY OF PAGE PREVIEWS USING HARDWARE-INDEPENDENT GRAPHICS COMMANDS |
| 14/285,200 | ON-DEMAND DETECTION OF USER INPUT TARGETS |
| 14/285,060 | CONVERSION OF CONTENT PAGES INTO SETS OF TILES FOR DELIVERY TO AND EFFICIENT DISPLAY ON USER DEVICES |
| 14/285,275 | TRANSFERRING DAMAGED PORTIONS OF A RENDERED PAGE TO A USER DEVICE |
| 14/285,334 | UPDATING DAMAGED PORTIONS OF RENDERED PAGES THAT CONTAIN VIDEO CONTENT |
| 14/285,300 | SPLIT BROWSER ARCHITECTURE CAPABLE OF DELIVERING VIDEO STREAMS TO USER DEVICES |
| 14/285,477 | DISTRIBUTED CONTENT BROWSING SYSTEM USING TRANSFERRED HARDWARE-INDEPENDENT GRAPHICS COMMANDS |
| 14/285,531 | BANDWIDTH REDUCTION THROUGH DELIVERY OF HARDWARE-INDEPENDENT GRAPHICS COMMANDS FOR PORTIONS OF CONTENT PAGES |
| 14/285,557 | CACHING OF CONTENT PAGE LAYERS |
| 14/285,442 | SPLIT BROWSER ARCHITECTURE CAPABLE OF DELIVERING LAYERS TO USER DEVICES |
| 14/285,504 | BROWSER ARCHITECTURE CAPABLE OF DELIVERING GRAPHICS COMMANDS TO USER DEVICES |

The disclosures of the above-referenced applications are hereby incorporated by reference.

BACKGROUND

When a user requests a web page or other content page via a browser, the user typically experiences a noticeable delay before the page is fully or even partially displayed. Various factors can contribute to this delay. These factors include, for example, (1) the speed of the wireless or wired connection between the user's device and the Internet, (2) the location of, and load on, the origin server that hosts the page, (3) the size of the page, including any embedded graphics, (4) whether, and the extent to which, the page includes embedded objects that need to be separately retrieved (possibly from different domains) once the page's HTML has been loaded, (5) the complexity of the page's coding, including any scripts, and (6) the processing power of the user's device. When the delay is significant (e.g., several seconds or more), the task of browsing can be frustrating for users.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
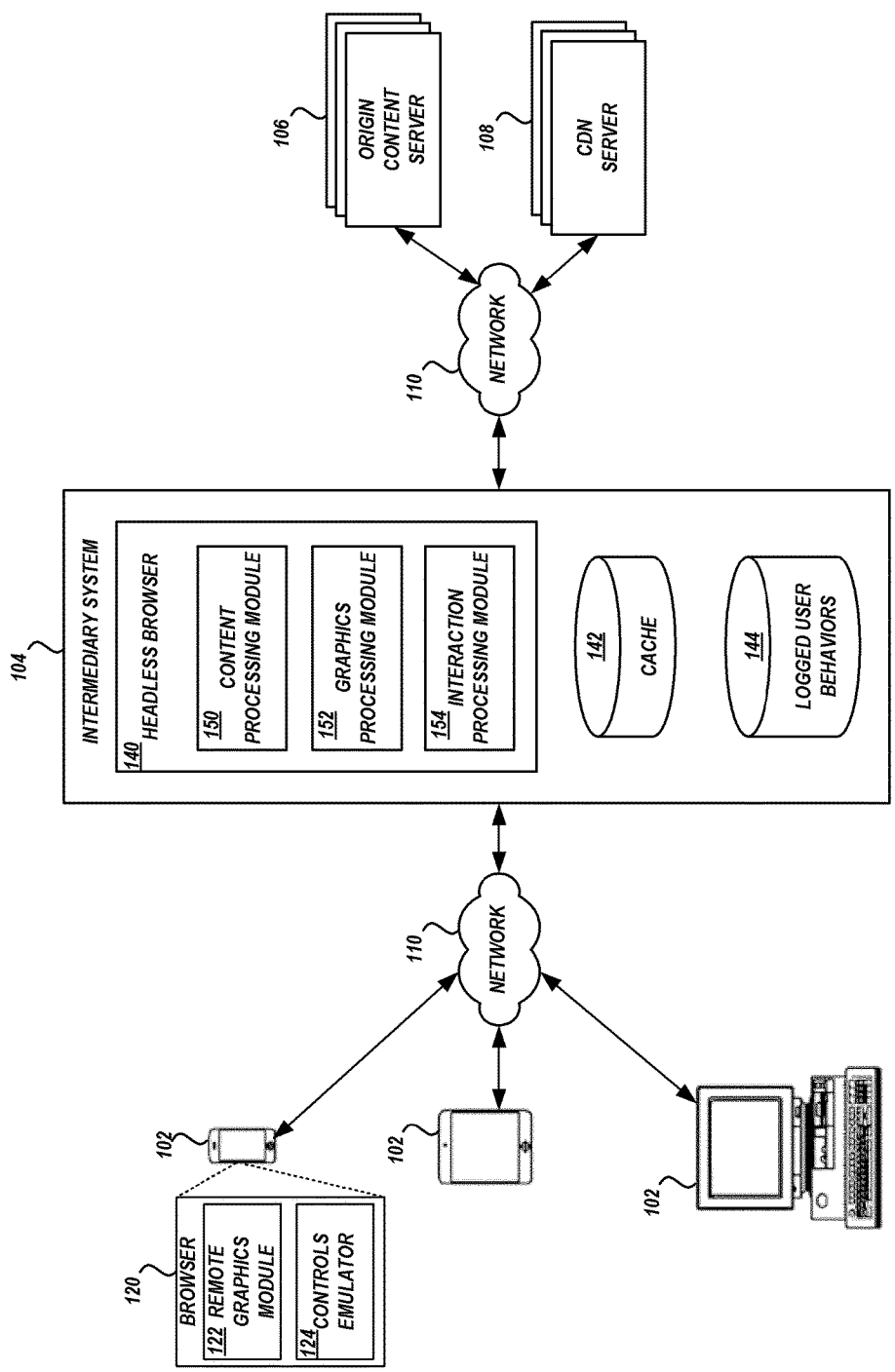
FIG. 1 illustrates a content delivery environment with an intermediary system that processes content and generates display commands for execution on user devices according to one embodiment.

One method for reducing page load times is to offload some of the processing (including rendering) to an intermediary system (e.g., a proxy system) that sits logically between the user's computing device and a system that hosts the network page or content page. For example, instead of the user's device accessing the host system that hosts the network page (e.g., web page) to access or retrieve each content resource (e.g., images, text, audio, video, scripts, etc.) of the network page, the intermediary system can retrieve each of the content resources, render the page, and can generate a graphical representation (e.g., digital photos, images, or snapshots) of all or a portion of the page. The intermediary system can then provide the graphical representation to the user's device for presentation to the user. This approach often reduces page load times experienced by end users. This reduction is due in part to the reduced need for the user device to handle computation-intensive page rendering tasks. Thus, presenting a graphical representation of the page to a user can result in noticeable performance improvements, particularly with respect to non-interactive pages.

However, for content pages that include interactive elements (e.g., search fields, drop-down boxes, hyperlinks, etc.), presenting a graphical representation of the page without more may be unacceptable for some use-cases. One solution is to provide a graphical representation of a page to a user device if the page does not include interactive elements or many interactive elements and to provide the content page itself to the user device if the page does include a number of interactive elements. However, providing the unmodified content page to the user device reduces the benefits achieved by offloading processing to an intermediary system.

The embodiments described herein present systems and methods for emulating one or more interactive elements, or controls, of a content page on a user device. The emulated interactive elements or emulated controls may be included as part of an overlay layer positioned above a graphical representation of the content page. Information or control metadata for each control included in the content page may be provided to a user device along with the graphical representation of the content page. The user device, or systems therein, may use the control metadata to identify types of controls to emulate. Further, the user device may identify where to position the emulated control with respect to the graphical representation of the content page based at least partially on the received control metadata.

In certain embodiments, the emulated control can react to user input without communicating with the intermediary system. For example, a user can interact with a scrollbar element or control, a drop-down box, or a slider control without communicating with the intermediary system. The user device can modify the presentation of the control in response to the user input. Further, the user device may modify the graphical representation of the content page based on the user input and/or may load an alternative graphical representation of the content page stored in a cache of the user device.

Alternatively, or in addition, interactions with the emulated controls may be provided to the intermediary system for processing. Further, an identifier of the control being simulated by the emulated control that received the user input may be provided to the intermediary system. Using the identifier of the control to identify the control, the intermediary system may interact with the control of the content page at a host system based on the user input received by the emulated controls. In some cases, interactions with the content page may result in the content page being modified and/or a new content page being retrieved. In some such cases, the intermediary system may generate a new graphical representation associated with the updated content page and/or the new content page. This new graphical representation may be provided to the user device for display to the user. Thus, in certain embodiments, the processing of interactions with a content page may be offloaded from a user device to an intermediary system. Further, in some embodiments, by offloading the processing to the intermediary system, page load times perceived by end users are reduced without loss of interactivity with the page.

System Components

FIG. 1 illustrates an example network environment in which features can be implemented for processing content pages at an intermediary system and for generating display commands for execution at a user device. The network environment shown in FIG. 1 includes various user devices 102, an intermediary system 104, and various content sources, including origin content servers 106 and content delivery network ("CDN") servers 108. The system components may communicate with each other via one or more communication networks 110. A network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc., or combination thereof, each with access to and/or from an external network, such as the Internet.

As will be appreciated by those of skill in the relevant art, a network environment may include any number of distinct user devices 102 and/or content sources 106, 108. In addition, multiple (e.g., two or more) intermediary systems 104 may be used. For example, separate intermediary systems 104 may be located so that they are close (in either a geographical or networking sense) to groups of current or potential user devices 102 or content sources 106, 108. In such a configuration, a user device 102 may request content via the intermediary system 104 to which it is closest, rather than all user devices 102 requesting content via a single intermediary system 104.

The user devices 102 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), kiosks, and various other electronic devices and appliances. Individual user devices 102 may execute a browser application 120 to communicate via the network 110 with other computing systems, such as the intermediary system 104 or content sources 106 and 108, in order to request and display content.

Illustratively, a user may use a browser application 120, or other application capable of accessing a network site, to request network-accessible content (e.g., content pages, images, video, etc.) hosted or provided by a content source, such as an origin content server 106 or a CDN server 108. The user device 102 or browser application 120 may be associated with the intermediary system 104 or otherwise configured to request the content through, and receive content display commands from, the intermediary system 104 rather than communicating directly with the content source. The browser application 120 may include a remote graphics module 122 that receives remotely-generated display commands, such as those generated by the intermediary system 104. The remote graphics module 122 (or some other module of the browser application 120 or user device 102) can execute the remote-generated display commands to display a representation of the requested content on the user device 102. Advantageously, the remote graphics module 122 may facilitate the display of graphical representations of requested content on the user device 102 without requiring the user device 102 to receive content files (e.g., HTML files, JPEG images, etc.) directly or indirectly from content sources 106 and 108.

In some embodiments, the browser 120 may be a conventional web browser or network-site browser that is not specifically designed or configured to execute remotely-generated graphics commands and other display commands. For example, the browser 120 may use or otherwise be associated with a remote graphics module 122 that may or may not be integrated with the browser 120, such as a browser add-in or extension. In some embodiments, applications other than a browser 120 may include or use a remote graphics module 122 (or some similar module) to execute graphics commands generated by an intermediary system 104. For example, content aggregators or other specialized content display applications for mobile devices (e.g., FLIPBOARD) may utilize a remote graphics module 122.

The browser 120 may include a controls emulator 124, which may be configured to emulate, or generate representations of, one or more controls of a content page. The controls emulator 124 may use control metadata received from the intermediary system 104 to determine the number of controls to emulate, the type of controls to emulate, and the location of the controls with respect to a content page. Using the control metadata, the controls emulator 124 can emulate one or more controls and position the emulated controls over a graphical representation of the content page on the user device. Advantageously, in certain embodiments, by positioning emulated controls over the graphical representation of the content page a user can interact with the content page despite being presented with the graphical representation of the content page in place of the content page. In other words, in some cases, although a user may be presented with an image or snapshot of the content page, the user may interact with the content page using the emulated controls that are positioned or layered over the image of the content page.

In certain embodiments, the emulated controls include the same or similar functionality as the controls they mimic. When a user interacts with the emulated controls, the interaction and/or input to the emulated controls may be provided to the intermediary system 104. Intermediary system 104 may replicate the interaction on a system that hosts the content page (e.g., the origin content server 106) and/or may provide the input to the host system of the content page. In certain embodiments, intermediary system 104 may access and/or retrieve a modified version of the content page that is responsive to the interaction with and/or input provided to the host system of the content page. The intermediary system 104 may generate a graphical representation of the modified version of the content page and provide the graphical representation to the user device 102. Thus, in certain embodiments, the user may interact with a content page via emulated controls and through the intermediary system 104 despite being presented with an image or graphical representation of the content page at the user device 102 in place of the content page itself.

The intermediary system 104 can be a computing system configured to retrieve content on behalf of user devices 102 and generate display commands for execution by the user devices 102. For example, the intermediary system 104 can be a physical server or group of physical servers that may be accessed via the network 110. In some embodiments, the intermediary system 104 may be a proxy server, a system operated by an internet service provider (ISP), and/or some other device or group of devices that retrieves content on behalf of user devices 102.

The intermediary system 104 may include various modules, components, data stores, and the like to provide the content retrieval and processing functionality described herein. For example, the intermediary system 104 may include a server-based browser application or some other content rendering application to process content retrieved from content sources. Such a content rendering application may be referred to as a "headless browser" 140. Generally described, a headless browser 140 does not (or is not required to) cause display of content by a graphical display device of the server on which the headless browser 140 is executing. Instead, the headless browser 140 provides display commands, graphical representations, images, or other data or commands to separate user devices 102 that can cause the presentation of content accessed by the headless browser 140 on one or more of the separate user devices 102. Illustratively, the headless browser 140 may obtain requested content from an origin content server 106 and/or CDN server 108, obtain additional items (e.g., images and executable code files) referenced by the requested content, execute code (e.g., JavaScript) that may be included in or referenced by the content, generate graphics commands to display a graphical representation of the content, and transmit the graphics commands to the user device 102. Further, in some cases, the headless browser 140 may create graphical representations of a content page or a network page, or one or more content resources of the content page, and provide the graphical representations to the user device 102. By performing some or all of these operations at the intermediary system 104, the substantial computing resources and high-speed network connections typically available to network-based server systems may be leveraged to perform the operations much more quickly than would be possible on a user device 102 with comparatively limited processing capability. Although the headless browser 140 does not typically cause the display of content by a graphical display device of the server, in some embodiments, it may. For example, in some cases, a copy of content provided to a user device 102 for display may also be displayed on the graphical display device of the intermediary system 104.

The headless browser 140 may include various modules to provide the functionality described above and in greater detail below. For example, the headless browser 140 may include a content processing module 150, a graphics processing module 152, and an interaction processing module 154. The content processing module 150 may include any system that can parse content files and generate a document object model ("DOM") or similar representation of the content. Further, in some cases, the content processing module 150 may include logic for determining how to divide a content page into a set of tiles to be provided to the browser 120 and/or the remote graphics module 122. The graphics processing module 152 may include any system that can receive the DOM representation and generate display commands (e.g., SKIA commands) to render a graphical representation of the content on a user device 102. In some cases, the graphics processing module 152 may further receive definitions or metadata for each tile from the set of tiles determined by the content processing module 150. The graphics processing module 152 may use the tile definitions to generate the display commands to render the graphical representation of the content at the user device 102. For instance, each tile may be associated with its own display command or set of commands for displaying the tile on the user device 102. In some embodiments, the graphics processing module 152 instead of, or in addition to, the content processing module 150 may determine how to divide the content page into the set of tiles. The interaction processing module 154 may include any system that communicates with the browser 120 to receive information regarding interactions with the content on the user device 102 and to update the graphical representation of the content, if necessary. Further, the interaction processing module 154 may provide the tiles and/or display commands to the user device 102. In some embodiments, a headless browser 140 may include additional or fewer modules than those shown in FIG. 1.

The intermediary system 104 may include additional modules, components, data stores, and the like to provide the features described above and in greater detail below. For example, the intermediary system 104 may include a cache 142 that stores content items retrieved from content sources 106 and 108, graphics commands generated by the headless browser 140, graphical representations of content resources or portions of the content page, and the like. The intermediary system 104 may also include a "logged user behaviors" data store 144 that stores information about user requests and interactions with content. In some embodiments, the information stored in the behaviors data store 144 is kept for a specific time period and then automatically deleted. For example, data related to a browsing session may be stored while the browsing session is ongoing and then deleted when the browsing session ends. Thus, in this example, browsing may be optimized without compromising privacy.

In some embodiments, the cache 142 may store graphical representations of content pages generated by the headless browser 140, together with any controls metadata for emulating one or more controls included in the content pages, for a predetermined period of time after the content page request or after connection between the user device and the intermediary system has terminated. Accordingly, if the user of the user device requests the content page again within the predetermined time period, the graphical representation of the content page, the controls metadata and any other data can be retrieved from the cache 142 and delivered to user device 102 without the need to re-generate the graphical representation of the content page, re-determine controls metadata, or re-retrieve the content page. In some embodiments, persistence of the graphical representation of the content page and the controls metadata in the cache 142 can reduce user-perceived page load times for recently requested pages. For instance, if a user device runs out of battery power or otherwise powers down in the middle of a browsing session, the graphical representation of the content page and the controls metadata may be quickly re-delivered to the user device upon powering on and reestablishing connection with the intermediary system 104. In some embodiments, interactions stored in the logged user behaviors data store 144 can be used to deliver an graphical representation of the content page and controls metadata reflecting previous user interactions with the page. In other embodiments, the cache 142 may store a graphical representation of the content page representing a most recent visual representation displayed on the user device as well as controls metadata for controls included in the most recent version of the emulated content page.

Although in the examples described herein the intermediary system 104 is configured to communicate between the origin content servers 106 and CDN servers 108 and user devices 102 to execute the processes described herein, in some embodiments the origin content servers 106 and/or CDN servers 108 can be configured to generate graphical representations of content pages and to provide controls metadata to enable the user devices 102 to emulate controls in the content pages and to send the graphical representation of the content pages and the controls metadata directly to a user device. For example, the capability to perform the graphical representation generation processes and the controls metadata determination processes can be provided to origin content servers 106 and CDN servers 108 in the form of an add-in, plug-in, or extension. The origin content servers 106 or CDN servers 108 can, in some embodiments, assess whether the graphical representation generation and controls metadata determination techniques should be used for a given page request based on factors such as whether the techniques would result in reduced user-perceived page load time, processor usage, or battery usage, among other things, relative to at least one alternative rendering technique. In some cases, the content servers 106 or CDN servers 108 can determine whether the graphical representation generation and controls metadata determination techniques are optimal for a given page load based on a number of factors, for example the speed, bandwidth, latency, and type of network connection with user device as well as characteristics of the content site and whether this feature is supported by the user device. Accordingly, any of the graphical representation generation and controls metadata determination processes described herein as being performed by the intermediary system 104 can, in some embodiments, be performed additionally or exclusively by the origin content servers 106 and/or CDN servers 108, in which case the intermediary system may be omitted.

Example Page Access Process

Figure 2:
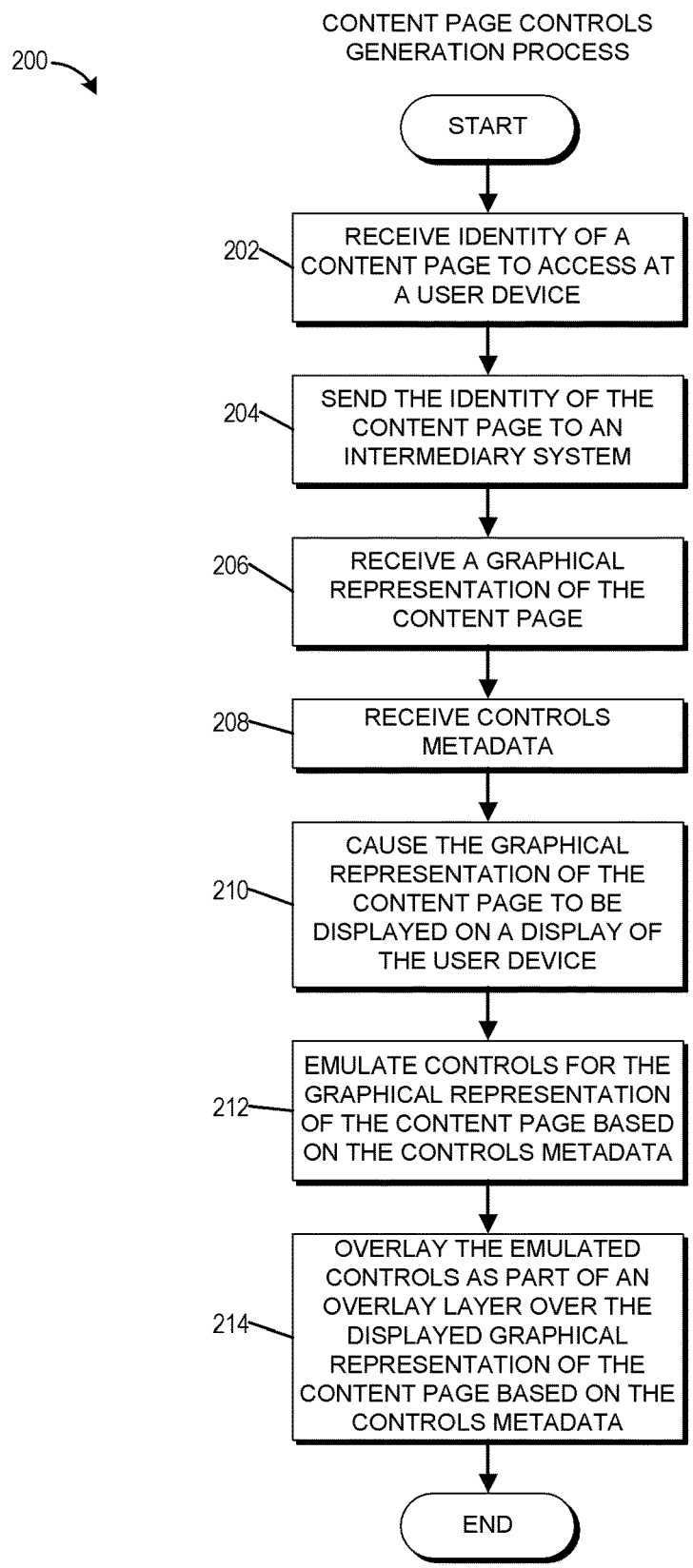
FIG. 2 is a flowchart of an embodiment of a content page controls generation process.

FIG. 2 is a flowchart of an embodiment of a content page controls generation process. The process 200 can be implemented by any system that can request access to a content page, present a graphical representation of the content page to a user, emulate a set of controls included in the content page, and present the emulated controls to the user. For example, the process 200, in whole or in part, can be implemented by a user device 102, a browser 120, a remote graphics module 122, or a controls emulator 124, to name a few. Although any number of systems, in whole or in part, can implement the process 200, to simplify the discussion, portions of the process 200 will be described with reference to particular systems.

The process 200 begins at block 202 where, for example, the browser 120 receives an identifier of a content page to access at the user device 102. The identifier of the content page may be based on a content page location represented by, for example, a uniform resource locator (URL) or a uniform resource indicator (URI), and may be received from a user by the browser 120. At block 204, the browser 120 sends the identifier of the content page to a proxy system or other intermediary system, such as the intermediary system 104.

At block 206, the browser's remote graphics module 122 receives a graphical representation of the content page. This graphical representation is not limited in form. For example, the graphical representation of the content page may include a set of tiles that is representative of the content page. Each of the tiles may include an image (e.g., bitmaps, JPEGs, GIFs, tiffs, etc.) of a respective portion of the content page. Alternatively, the graphical representation of the content page may be represented by a snapshot or screen capture of the content page.

At block 208, the browser's controls emulator 124 receives controls metadata corresponding to controls included in the content page. The controls metadata may include at least enough information sufficient to emulate a control included in the content page. Typically, the controls metadata for each control includes a control type for the control and a location of the control within the content page. However, the controls metadata is not limited as such and may include additional data for each control. For example, the controls metadata may include reaction information for the control that identifies how the control responds to user input. Although the reaction information may be defined by the control type and therefore superfluous, in some cases, the reaction information may be user or context specific (e.g., defined by an entity associated with the content page) and may differ from a default reaction four that the control type. For example, reaction information for a drop-down box may indicate that upon selection by a user a drop-down box should flash and make an audible sound in addition to expanding to present the options included in the drop-down box. Further, in some cases, the controls metadata may include information for identifying the control on the content page. Thus, a control that corresponds to the emulated control can be identified. In certain cases, the ability to identify the corresponding control on the content page can be useful for simulating interactions with the emulated control at the corresponding control. For example, in cases where interaction information with the emulated control is provided to the intermediary system 104 or to the origin content server 106, the control corresponding to the emulated control can be identified and the interaction can be simulated or repeated with the corresponding control of the emulated control. Moreover, the controls metadata can include styling or look and feel information, such as font styles, background colors, control element colors, etc., so that the emulated control matches the representation of the control on the content page.

At block 210, the remote graphics module 122 causes the graphical representation of the content page to be displayed on a display of the user device 102. At block 212, the controls emulator 124 emulates, or generates representations of, controls for the graphical representation of the content page based on the controls metadata. These emulated controls emulate the controls included in the content page itself that would be accessible to the user device 102 if the user device 102 were presenting the content page instead of the graphical representation of the content page. In some cases, the type of controls that can be emulated may be limited by the amount of resources necessary to emulate the control and/or the amount of interaction between user device 102 and a host system of the content page required by the control. However, typically both the controls of the content page and the emulated controls are not limited in type and may include any type of control that can be included in the content page. For example, the controls can include: a checkbox, a radio button, a drop-down, a text box, a button, a spinner, a list box, a combo box, a tooltip, a slider, a scroll bar, and application-specific controls may be generated, for example, by an entity associated with the content page. In some embodiments, the emulated controls may appear and may function identically to the controls included in the content page. In other embodiments, the emulated controls may be modified based on the functionality of the user device 102. For example, if the color or an image resolution of the depiction of the control of the content page is not supported by the user device 102, the emulated control may use a different color or a lower resolution.

At block 214, the controls emulator 124 includes the emulated controls created at the block 212 as part of an overlay layer that is positioned above the graphical representation of the content page presented to the user. In other words, the layer with the emulated controls is placed on top of the graphical representation of the content page as viewed from a top-down perspective. The positioning of each emulated control within the overlay layer may be based on the controls metadata received at the block 208. Typically, the emulated controls are not visible to the user. In other words, the emulated controls may be transparent. However, in other cases, the emulated controls may be visible to the user, but may mimic the controls included in the content page and therefore, may be visually indistinguishable to the user from an image of the control included in the graphical representation of the content page. In other cases, the emulated controls may be identifiable (e.g., annotated or highlighted) by the user as emulated controls, In certain embodiments, the emulated controls are not included as part of an overlay layer, but emulated control may be overlaid over a corresponding image of the control included in the graphical representation of the content page.

In some embodiments, the user device 102 may receive the controls metadata over time. For example, the user device 102 may receive controls metadata for a text box and a button at one point in time and may receive controls metadata for a checkbox and another button at a different point in time. Further, in some cases, the user device 102 may receive multiple iterations of the controls metadata or the controls metadata for a particular control. Similarly, the user device 102 may receive portions of the graphical representation of the content page as well as multiple iterations of the graphical representation of the content page over time. As the graphical representations of the content page are received, they may be output to a display of the user device 102. Similarly, as controls metadata is received, one or more controls may be emulated and included as part of an overlay layer that may be positioned over the displayed graphical representation of the content page. Advantageously, in certain embodiments, by creating the emulated controls and overlaying the emulated controls over a displayed graphical representation of the content page as the controls metadata is received, a user can begin interacting with the simulated or emulated content page sooner than if the user device 102 waits to receive all of the controls metadata before creating the interactive overlay layer.

In certain embodiments, the block 214 may include creating multiple overlay layers that may be positioned over the graphical representation of the content page. For example, different overlay layers may be created for different portions of the graphical representation of the content page. In one instance, the graphical representation of the content page may be created from four separate images combined together or may be divided into four portions, either as four images or conceptually. For each of the four portions, a separate overlay layer may be generated. Alternatively, or in addition, multiple overlay layers may be layered over the same portion of the graphical representation of the content page. For example, as control metadata for a number of controls is received, overlay layers that include emulated controls may be placed over the graphical representation of the content page. When additional control metadata is received for additional controls, a new overlay layer may be layered over the previous overlay layer creating a stack of overlay layers, each having different emulated controls. As another example, a different overlay layer may be created for different types of controls, which each overlay layer added to a stack of overlay layers. Advantageously, in certain embodiments, by stacking overlay layers, emulated controls may be stacked. For example, an emulated control that causes a dialog box to be created can be layered over an emulated button control. In such an example, if a user clicks on the emulated button, a process that simulates the process that occurs when the button is selected (e.g., the submission of user input or the playing of a video) may execute while a dialog box may also be created due to the dialog box pop-up control (e.g., an emulated link control or a second emulated button) layered over the emulated button.

The previous example described interacting with multiple emulated controls that have been layered over each other by being included in different overlay layers that have been stacked. In some alternative embodiments, when emulated controls are stacked as part of different overlay layers, emulated controls that are not in the top layer are inaccessible by a user. In yet some other alternative embodiments, only the top-most emulated controller in a particular location of the graphical representation of the content page is accessible. However, the emulated control may be in an overlay layer other than the top-most layer. For example, one emulated control may be in a top corner of an overlay layer and another emulated control may be in a bottom corner, but in a second overlay layer that is beneath the overlay layer with the emulated control in the top corner. In this example, both emulated controls may be accessible, or only the emulated control in the top layer may be accessible. If a third emulated control is placed beneath the emulated control in the top corner, it may or may not be accessible by a user depending on the embodiment implemented. In some implementations, different embodiments relating to the accessibility of the emulated controls in different overlay layers may be combined. For example, in a top half of the graphical representation of the content page, only emulated controls in the top-most overlay layer may be accessible, while in a bottom half of the graphical representation of the content page, emulated controls in any overlay layer may be accessible by a user. In some embodiments, as additional controls metadata is received, a new overlay layer that includes emulated controls may be generated and may replace an existing overlay layer that includes emulated controls based on previously received controls metadata.

Example Control Interaction Process—User Device

Figure 3:
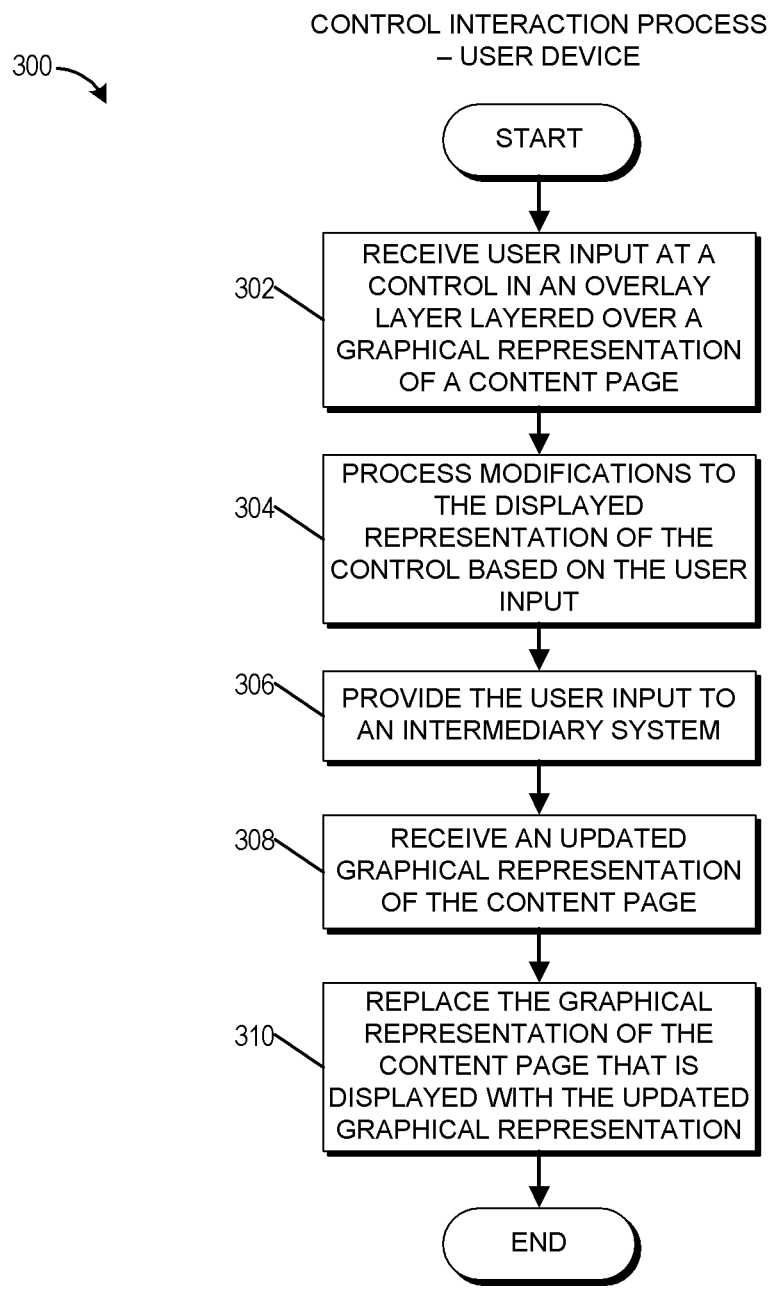
FIG. 3 is a flowchart of an embodiment of a control interaction process from the perspective of a user device.

FIG. 3 is a flowchart of an embodiment of a control interaction process 300 from the perspective of a user device 102. The process 300 can be implemented by any system that can receive and respond to user interaction with an emulated control. For example, the process 300, in whole or in part, can be implemented by a user device 102, a browser 120, a remote graphics module 122, or a controls emulator 124, to name a few. Although any number of systems, in whole or in part, can implement the process 300, to simplify the discussion, portions of the process 300 will be described with reference to particular systems.

The process 300 begins at the block 302 where, for example, the browser 120 receives user input representing interaction with a control (e.g., an emulated control) in an overlay layer positioned over a graphical representation of a content page. At block 304, the controls emulator 124 processes modifications to the displayed representation of the control, or the emulated control, based on the user input. Modifications to the displayed emulated control may be based on the control type of the emulated control. For example, user input with respect to a drop-down box may result in the drop-down box expanding and the presentation of additional text. As a second example, user input with respect to a text box may result in text being presented to the user. As a third example, interaction with respect to a checkbox may result in a checkmark or 'X' being presented or ceasing to be presented to the user in the checkbox. In some embodiments, the block 304 may be omitted. In other words, the user input with respect to an emulated control that does not modify the presentation of the control may result in the block 304 being omitted. For example, in some cases, if a user attempts to select a radio button that is already in a selected state or is un-selectable (e.g., is grayed out), a presentation of the radio button may not change in response to the user input received at the block 302 and the block 304 may be omitted.

At the block 306, the browser 120 provides the user input to an intermediary system 104, or in some cases, to a system hosting the content page (e.g., an origin content server 106). Further, the block 306 may include providing controls metadata associated with the emulated control that receives the user input to the intermediary system 104. This controls metadata may include enough information to identify the control of the content page corresponding to the emulated control. For example, the controls metadata may include an identification of a location of the control within the content page. Often, the intermediary system 104 to which the user input is provided is the same intermediary system 104 that provided the graphical representation of the content page to the user device 102 as part of the process 200. However, in some cases, the intermediary system 104 of the process 300 may differ from that of the process 200. For example, if the user device 102 is moved to a different geographical location subsequent to the process 200, the user device 102 may interact with a different intermediary system. In some cases, the block 306 may be omitted. For example, a user interaction with an emulated control that does not result in the modification of a content page may cause the block 306 to be omitted. For instance, a user interaction with a scrollbar control may not necessitate interaction with the intermediary system if, for example, the user device 102 has cached a graphical representation of the content page that corresponds to the resulting scroll action from the user's interaction with the scrollbar control.

At block 308, the remote graphics module 122 receives an updated graphical representation of the content page. In some cases, the updated graphical representation may correspond to a portion of the content page that has been modified based on the user input received at the block 302 and provided to the intermediary system at the block 306. Further, in some cases, the block 308 may include receiving a new graphical representation of the content page or of a new content page. At the block 310, the remote graphics module 122 replaces the graphical representation of the content page that is being displayed with the updated graphical representation received at the block 308. In some cases, the remote graphics module 122 replaces a portion of the graphical representation of the content page with the updated graphical representation received at the block 308. In certain embodiments, if several updated graphical representations of the content page are received at the same time or at a substantially similar time, the block 310 may include replacing the graphical representation with the most recent updated graphical representation of the content page. Thus, in some cases, outdated updated graphical representations may be omitted from presentation to the user. For instance, suppose that an emulated control is receiving user input continuously for a period of time (e.g., a text box serving as a search field that continues to receive text input). In such an example, a number of updated graphical representations of the content page may be received over time. Some of these updated graphical representations may be outdated before they can be presented to the user. Advantageously, in certain embodiments, the process 300 can include omitting updated graphical representations that become outdated from presentation to the user and can include presenting the most recent updated graphical representation of the content page received at the user device 102. By presenting the most recent updated graphical representation of the content page while omitting outdated updated graphical representations, the user experience of accessing and interacting with the content page may be improved.

In some embodiments, the block 308 may include receiving updated or new controls metadata enabling the controls emulator 124 to update the emulated controls or to emulate new controls to be included as part of an updated or new overlay layer. This updated or new overlay layer may be positioned over the updated graphical representation of the content page or over a graphical representation of a new content page received at the block 308.

Example Emulated Content Page Generation Process

Figure 4:
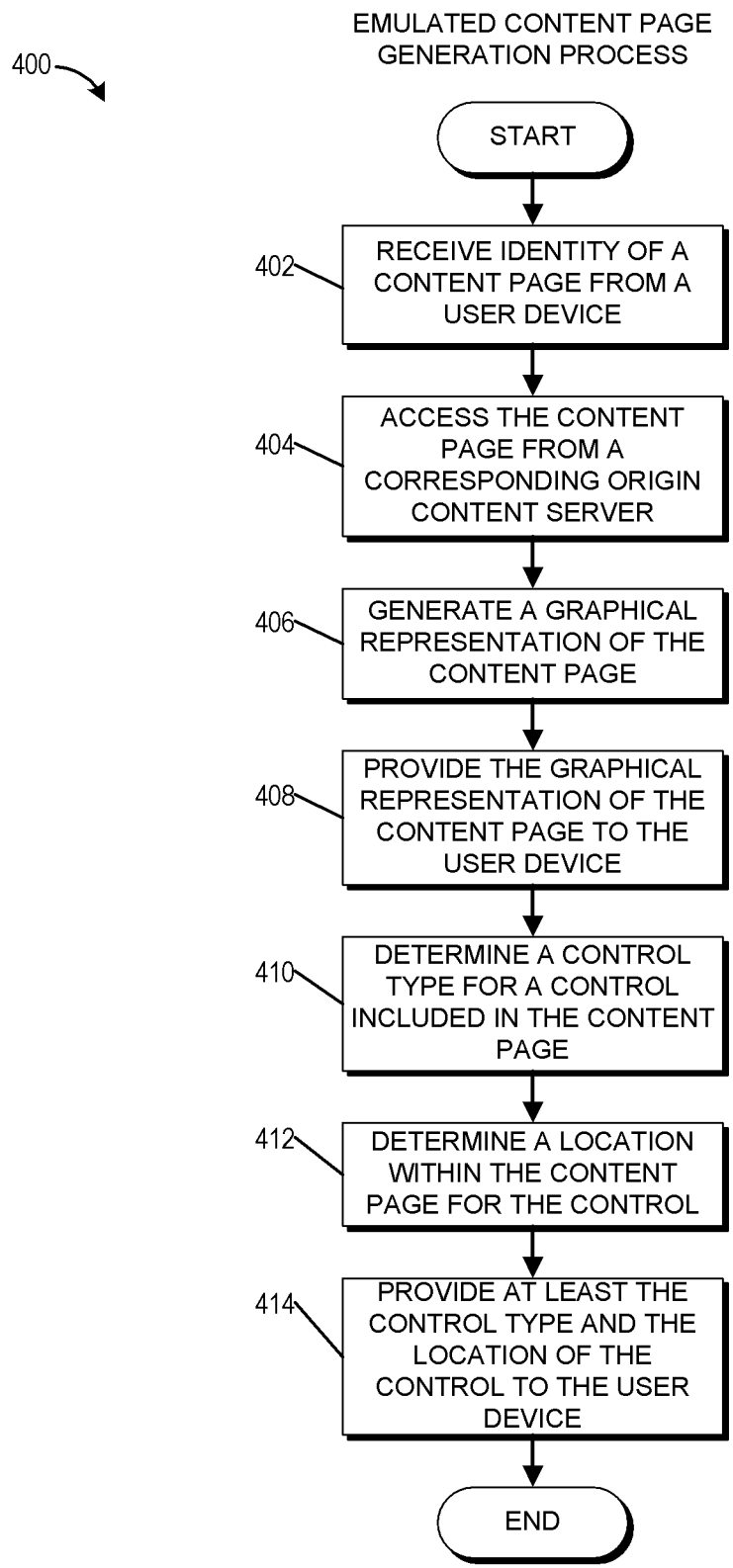
FIG. 4 is a flowchart of an embodiment of an emulated content page generation process.

FIG. 4 is a flowchart of an embodiment of an emulated content page generation process 400. The process 400 can be implemented by any system that can access the content page and can create a graphical representation of the content page. For example the process 400, in whole or in part, can be implemented by an intermediary system 104, a headless browser 140, a content processing module 150, a graphics processing module 152, or an interaction processing module 154, to name a few. Although any number of systems, in whole or in part, can implement the process 400, to simplify the discussion, portions of the process 400 will be described with reference to particular systems. Further, although the process 400 is primarily described with respect to the intermediary system 104 and its subsystems, in some embodiments the process 400 may be performed by a host system of a content page, such as an origin content server 106.

The process 400 begins at the block 402 where, for example, the intermediary system 104 receives an identifier of a content page from a user device 102. Receiving the identifier of the content page may include receiving a content page location (e.g., a URL or URI) within a network (e.g., the Internet). At block 404, the headless browser 140 accesses the content page from a corresponding origin content server 106. Alternatively, or in addition, the content page or portions thereof may be accessed from one or more CDN servers 108.

At block 406, the graphics processing module 152 generates a graphical representation of the content page accessed at the block 404. The graphical representation of the content page may include an image (e.g., a bitmap or JPEG), a snapshot, a screen capture, the set of tiles that represent images of the content page, or any other type of graphical representation of the content page. Some example embodiments of generating the graphical representation of the content page, including one or more sets of tiles, are described in U.S. application Ser. No. 14/285,060, titled "CONVERSION OF CONTENT PAGES INTO SETS OF TILES FOR DELIVERY TO AND EFFICIENT DISPLAY ON USER DEVICES," filed on May 22, 2014, which was previously incorporated by reference in its entirety above. In some embodiments, the graphical representation of the content page to be based at least in part on device configuration metadata associated with the user device 102. This device configuration metadata may be received from the user device 102 and/or accessed from a repository, such as the logged user behaviors repository 144.

At block 408, the interaction processing module 154 provides the graphical representation of the content page to the user device 102. At block 410, the content processing module 150 determines a control type for a control included in the content page. Further, at block 412, the content processing module 150 determines a location of the control within the content page. In certain embodiments, the content processing module 150 may repeat the processes associated with the blocks 410 and 412 for each control included in the content page identified at the block 402.

At block 414, the interaction processing module 154 provides at least the control type and the location of the control, as identified at the blocks 410 and 412 respectively, to the user device 102. In some embodiments, the block 414 may include providing additional metadata, which may be determined as part of at least one of the blocks 410 and 412, associated with the control to the user device 102. Typically, this additional metadata may be metadata that can help with the generation or emulation of the control at the user device 102. For example, the metadata may include content page specific modifications to controls that modify the controls from forms generally recognizable by those of skill within the art. For instance, metadata provided at the block 414 corresponding with a checkbox may indicate that the checkbox should present a smiley face when selected instead of a checkmark or an 'X' character. As another example, the metadata may include additional information for emulating particular types of controls. For instance, the metadata may include one or more labels that are to be included with radio buttons or checkboxes. As another example, the metadata may include list-box entries to be included in a list box or items to be included in a drop-down menu.

The process 400 may be repeated for multiple controls. Generally, the interaction processing module 154 provides controls metadata for emulating controls as the data is determined. This enables the user device 102 to begin emulating some of the controls while controls metadata for additional controls is being obtained and provided. However, in some cases, the controls metadata for at least a set of controls, and in some cases all of the controls, on a content page is obtained prior to sending the controls metadata to the user device 102.

Example Control Interaction Process—Intermediary System

Figure 5:
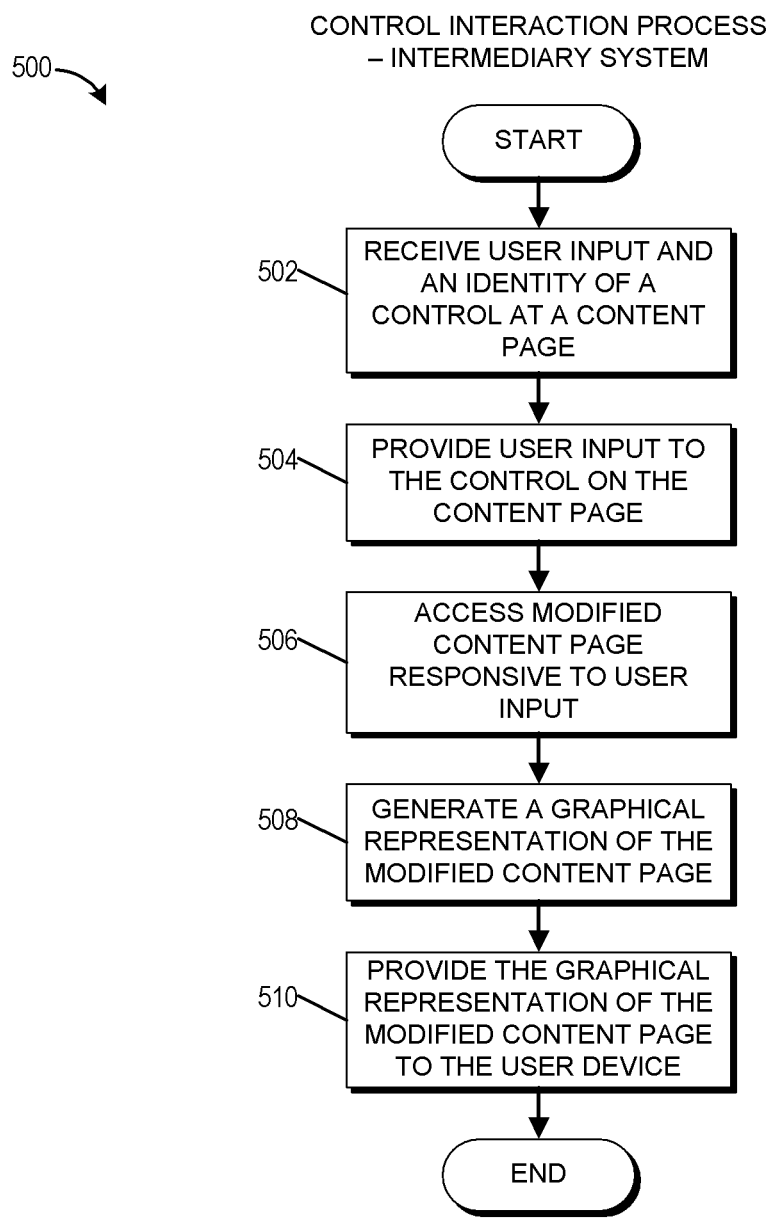
FIG. 5 is a flowchart of an embodiment of a control interaction process from the perspective of an intermediary system.

FIG. 5 is a flowchart of an embodiment of a control interaction process 500 from the perspective of an intermediary system. The process 500 can be implemented by any system that can receive user input and the identity of a control at a content page intended to receive the user input, and can provide a response to the user input to a user device. For example the process 500, in whole or in part, can be implemented by an intermediary system 104, a headless browser 140, a content processing module 150, a graphics processing module 152, or an interaction processing module 154, to name a few. Although any number of systems, in whole or in part, can implement the process 500, to simplify the discussion, portions of the process 500 will be described with reference to particular systems. Further, although the process 500 is primarily described with respect to the intermediary system 104 and its subsystems, in some embodiments the process 500 may be performed by a host system of a content page, such as an origin content server 106.

The process 500 begins at the block 502 where, for example, the intermediary system 104 receives user input and an identifier of a control at a content page. Further, the block 502 may include receiving the identifier of the content page itself. This identifier of the content page may be a URL or URI. Moreover receiving the identity of the control may include receiving an identifier corresponding to the control, receiving an identifier of the control type, and/or receiving a location of the control within the content page.

At the block 504, the interaction processing module 154 provides the user input to the control identified at the block 502. Providing the user input to the control may include applying the user input, or user interactions that provided or generated the user input, to the control on the content page. Alternatively, or in addition, providing the user input to the control may include simulating or mimicking a user action with respect to the content page that includes the control. The headless browser 140, at block 506, may access a modified content page that is responsive to the user input provided at the block 504. Alternatively, or in addition, the block 506 may include accessing or receiving output from a host system (e.g., the origin content server 106) of the content page. For example, the headless browser 140 may receive a file and/or a stream of an audio or video included in the content page. Further, in some embodiments, the block 506 may include accessing a new content page.

At block 508, the graphics processing module 152 generates a graphical representation of the modified content page accessed at the block 506. In some cases, the block 508 may include generating a graphical representation of a portion of the content page that has been modified. At the block 510, the interaction processing module 154 provides the graphical representation of the modified content page to the user device 102. This graphical representation may be an updated graphical representation of a version of the content page previously provided to the user device 102. In some cases, the block 510 may include providing the graphical representation of a portion of the content page that has been modified. In some such cases, the block 510 may also include providing an identification of the portion of the content page that has been modified, thereby enabling the user device 102 to determine a portion of a previously received graphical representation of the content page to replace with the newly received portion of a graphical representation of the modified content page.

In some embodiments, the process 500 may omit blocks 506, 508, 510. For example, in some cases, the user input provided to the content page may not result in any modification to the content page or the receipt of any files or data. In such cases, there may be no modified content page to access and therefore, it may be unnecessary to provide an updated graphical representation of the content page to the user device 102. In some cases, a file or data may be received responsive to the user input, but the content page may remain unmodified. In such cases, the block 508 may be omitted, and the block 510 may include providing the data and/or file to the user device 102 without providing a graphical representation of an updated or modified content page.

In some embodiments, the block 508 may include determining metadata (e.g., control type, control location, labels, etc.) for updated or new controls included in the modified content page, or a new content page. This metadata may be provided to the user device 102 as, for example, part of the block 510 enabling the user device 102 to emulate the updated or new controls.

Example Content Page Viewed on a User Device

Figure 6A:
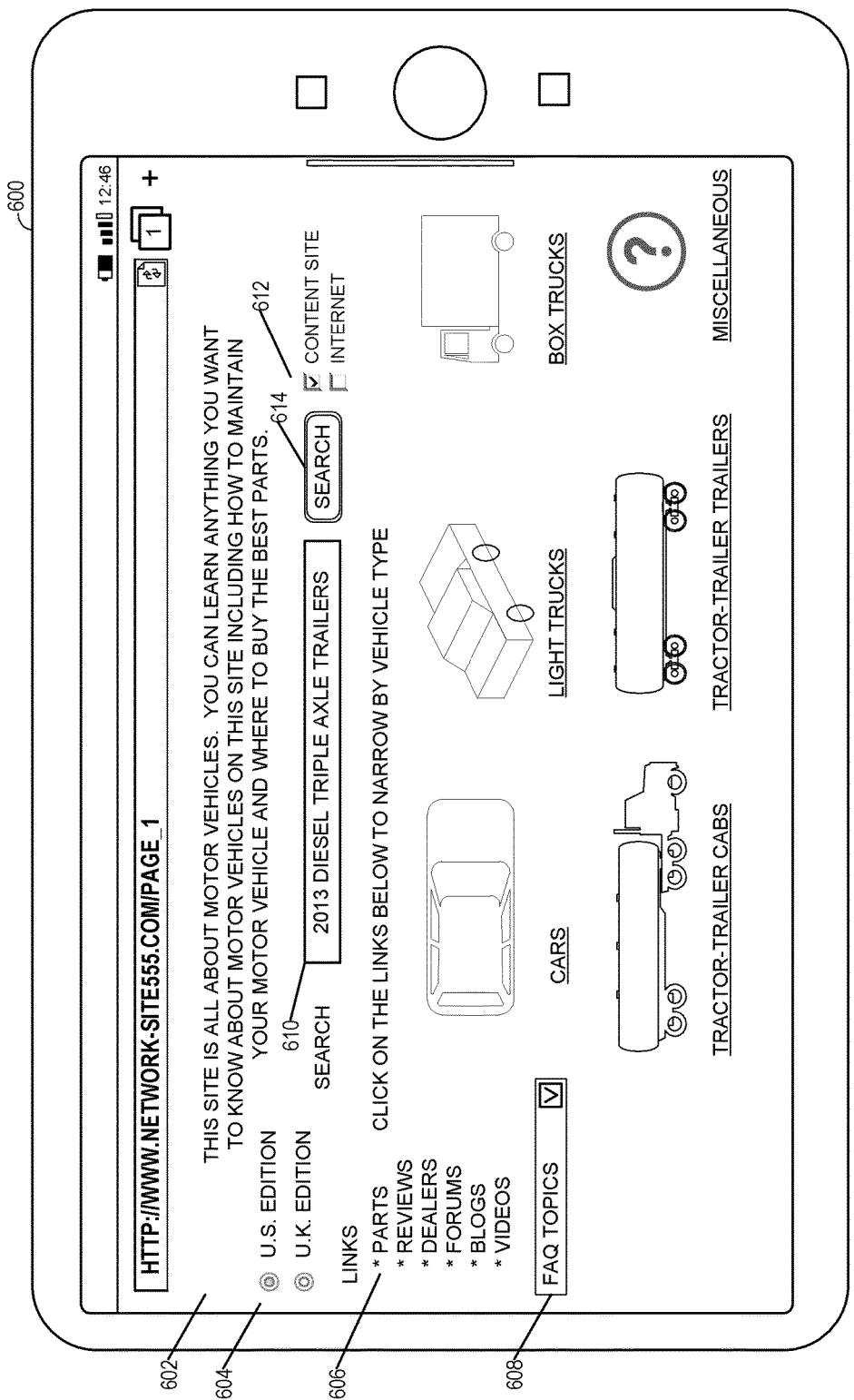
FIG. 6A illustrates an example of a content page viewed on a tablet computing device.

FIG. 6A illustrates an example of a content page viewed on a tablet computing device 600. This tablet computing device 600 may be an instance of a user device 102, and may include one or more of the embodiments described above with respect to the user device 102. Further, the tablet computing device 600 may be configured to perform one or more of the processes described herein, such as the process 200 or 300.

In the example depicted in FIG. 6A, the tablet computing device 600 loads the content page 602 from one or more systems hosting the content page 602, such as the origin content server 106 and/or one or more CDN servers 108. The content page 602 may include a number of different types of elements or content resources that are loaded and/or processed by the tablet computing device 600. For example, the content page 602 may include scripts (e.g., JavaScript), animations, images, text, links, Active Server Pages (ASP), etc. In addition, the content page 602 may include a number of controls, including a number of user interface elements. For example, the content page includes radio buttons 604, links or hyperlinks 606, a drop-down box 608, a text box 610, checkboxes 612, and a button 614. Those of skill in the art will recognize that other controls and user interface elements are possible, such as spinners, list boxes, scrollbars, sliders, combo boxes, etc. Accessing the various elements from the system or systems hosting the content page 602 and loading them on the tablet computing device 600 may be a resource intensive process and, depending on the network connection, may take several seconds if not longer for a content page with a number of resources.

Figure 6B:
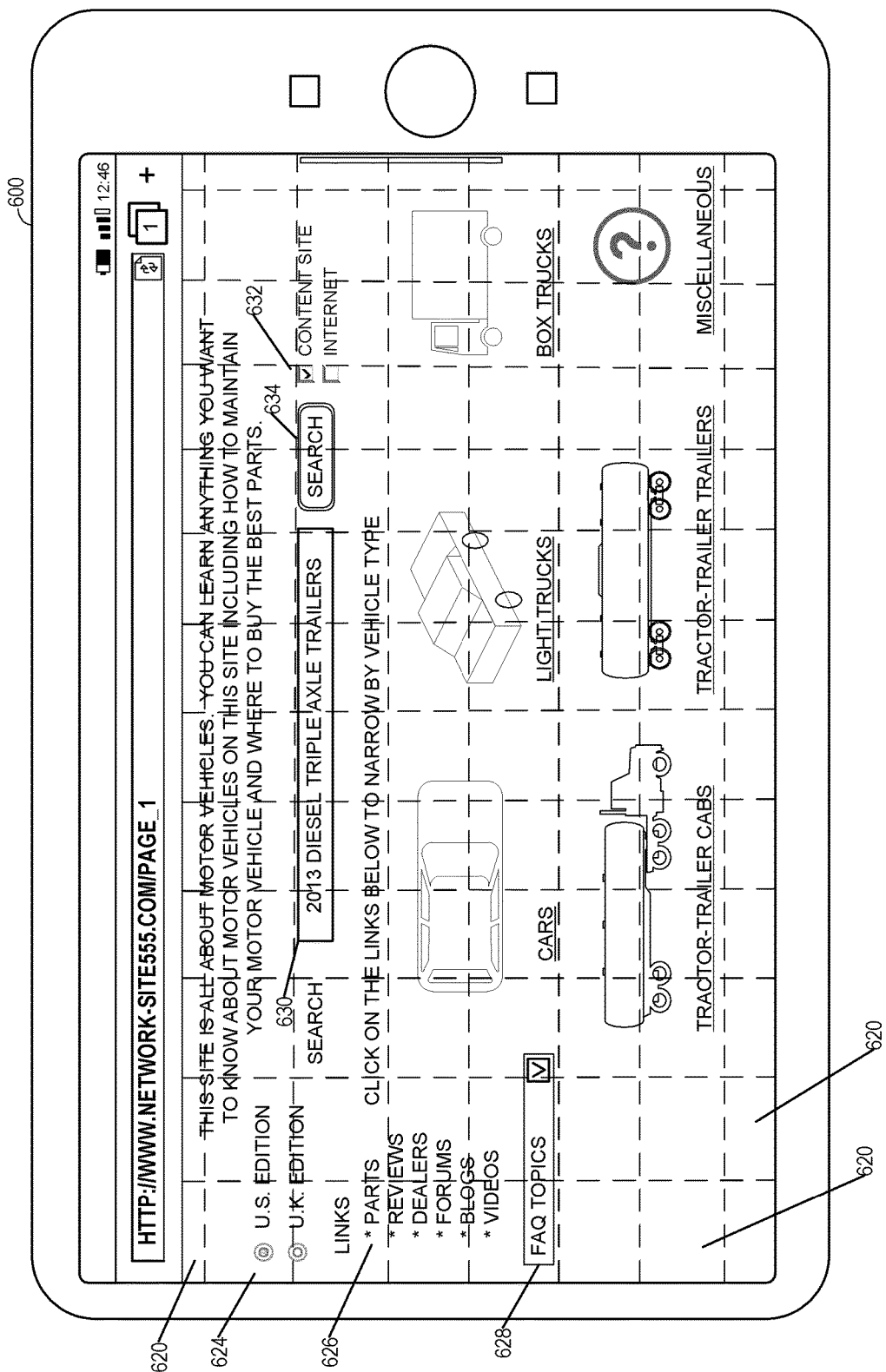
FIG. 6B illustrates an example of a graphical representation of the content page viewed in FIG. 6A along with an emulated control layer.

FIG. 6B illustrates an example of a graphical representation of the content page 602 viewed in FIG. 6A along with an emulated control layer. In other words, unlike in FIG. 6A where the tablet computing device 600 accesses the content page 602 and its content resources for presentation to a user, the tablet computing device 600 in FIG. 6B presents a graphical representation of the content page presented in FIG. 6A.

In the example depicted in FIG. 6B, the graphical representation of the content page 602 is created from a set of tiles 620. Each of the tiles 620 represents a graphical representation of a respective portion of the content page 602. A series of dashed lines is included in FIG. 6B to represent the tile boundaries of the set of tiles. It should be understood that the dashed lines are for illustrative purposes, and while they may be visible to a user in some embodiments, typically the tile boundaries and thus, the dashed lines are not visible to the user. Further, to simplify the illustration, only a few of the tiles are labeled with the reference numeral "620." However it should be understood that each of the squares or rectangles that are at least partially bounded by the dashed lines represent tiles that are graphical representations of a portion of the content page 602. Moreover, although the graphical representation of the content page 602 is represented by the set of tiles 620 in FIG. 6B, should be understood that alternative graphical representations of the content page 602 are possible. For example, the graphical representation of the content page 602 may comprise a screenshot or screen capture.

The emulated control layer of FIG. 6B may be layered over the graphical representation of the content page 602. Although the emulated control layer may not be visible to the user, the one or more emulated controls included in the emulated control layer may be visible. Alternatively, the emulated controls may also not be visible to the user, but as the emulated controls are layered over images of the controls included in the graphical representation of the content page 602, the user may interact with the emulated controls regardless of the visibility of the emulated controls. In the example depicted in FIG. 6B, the emulated controls included in the emulated control layer include a pair of radio button 624, a number of links or hyperlinks 626, a drop-down box 628, a text box 630, a pair of checkboxes 632, and a button 634. Each of these emulated controls correspond to the native controls included in the content page 602 identified with respect to FIG. 6. As previously described, despite a graphical representation of the content page 602 being presented to a user in place of the content page 602, using the emulated controls included in the emulated control layer, the user can interact with the graphical representation of the content page 602.

Terminology

The intermediary system 104 may be a single computing device, or it may include multiple distinct computing devices, such as computer servers, logically or physically grouped together to collectively operate as an intermediary system. The components of the intermediary system 104 can each be implemented as hardware, such as a server computing device, or as a combination of hardware and software. In addition, the modules and components of the intermediary system 104 can be combined on one server computing device or separated individually or into groups on several server computing devices. In some embodiments, the intermediary system 104 may include additional or fewer components than illustrated in FIG. 1.

In some embodiments, the features and services provided by the intermediary system 104 may be implemented as web services consumable via the communication network 110. In further embodiments, the intermediary system 104 is provided by one more virtual machines implemented in a hosted computing environment. The hosted computing environment may include one or more rapidly provisioned and released computing resources, which computing resources may include computing, networking and/or storage devices.

A hosted computing environment may also be referred to as a cloud computing environment.

The origin content servers 106 and CDN servers 108 can correspond to logical associations of one or more computing devices for hosting content and servicing requests for the hosted content over the network 110. For example, a content server 106 or CDN server 108 can include a web server component corresponding to one or more server computing devices for obtaining and processing requests for content (such as content pages) from user devices 102, the intermediary system 104, or other devices or service providers. In some embodiments, one or more content servers 106 may be associated with one or more CDN service providers (e.g., entities that manage multiple CDN servers 108), application service providers, etc.

A number of the processes described herein include accessing or performing operations at the intermediary system 104. For example, the process 400 and 500 may be performed, at least in part, by the intermediary system 104. However, in some embodiments, the processes may be performed by the origin server 106 or a system hosting the content page requested by the user device 102. For example, the graphical representation of the content page may be generated by the origin server 106 and the controls metadata may be determined and provided by the origin server 106. In some embodiments, the origin server 106 may include, or be provided, with a plug-in or other module that enables the origin server 106 to perform the functionality of the intermediary system 104, in which case the intermediary system may be omitted.

Many other variations than those described herein will be apparent from this disclosure. For example, depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

It is to be understood that not necessarily all such advantages can be achieved in accordance with any particular embodiment of the embodiments disclosed herein. Thus, the embodiments disclosed herein can be embodied or carried out in a manner that achieves or optimizes one advantage or group of advantages as taught herein without necessarily achieving other advantages as may be taught or suggested herein.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A method of providing access to a content page that includes one or more controls, the method comprising:
   receiving an identifier of a content page from a user device;
   retrieving the content page corresponding to the identifier from a host system;
   generating a first graphical representation of a first portion of the content page;
   determining first information associated with a first control included in the first portion of the content page, wherein the first information comprises information usable to emulate the first control at the user device thereby enabling the user device to restore interactivity with the first portion of the content page that is lost by converting the first portion of the content page into the first graphical representation of the content page;
   prior to determination of second information associated with a second control included in a second portion of the content page, providing the first information and the first graphical representation of the first portion of the content page to the user device for emulation by the user device;
   determining the second information associated with the second control included in the second portion of the content page, wherein the second information comprises information usable to emulate the second control at the user device; and
   subsequent to the emulation of the first control by the user device based on the first information, providing the second information to the user device such that the emulation of the second control by the user device based on the second information occurs while an emulated control corresponding to the first control is positioned over the first graphical representation by the user device,
   wherein the method is performed by an intermediary system comprising computer hardware.

2. The method of claim 1, wherein the first information comprises a control type and a location of the first control within the content page.

3. The method of claim 1, wherein the first graphical representation of the first portion of the content page comprises a non-interactive image of the content page.

4. The method of claim 1, further comprising:
   receiving, from the user device, an identifier of the first control and user input representing an interaction with the emulated control corresponding to the first control;
   retrieving a modified content page corresponding to the user input from the host system;
   generating a graphical representation of the modified content page; and
   providing the graphical representation of the modified content page to the user device.

5. The method of claim 4, further comprising transmitting the user input to the host system.

6. The method of claim 4, wherein generating the graphical representation of the modified content page comprises generating an updated graphical representation of at least a portion of the content page.

7. The method of claim 4, further comprising:
   determining third information associated with a third control included in the modified content page; and
   providing the third information to the user device.

8. The method of claim 1, further comprising:
   storing the first graphical representation of the content page and the first information in a cache;
   determining whether the user device has ceased presenting the first graphical representation of the content page and the emulated control corresponding to the first control on a display of the user device; and
   in response to determining that the user device has ceased presenting the first graphical representation of the content page and the emulated control corresponding to the first control on the display, waiting for a period of time and clearing the cache of the first graphical representation of the content page and the first information after the period of time has elapsed.

9. A method of emulating content controls for a content page, the method comprising:
   providing an identifier of a content page to an intermediary system comprising computer hardware; and
   responsive to providing the identifier of the content page:
      receiving a first graphical representation of a first portion of the content page;
      receiving first information for a first control included in the first portion of the content page, wherein the first graphical representation and the first information are provided by the intermediary system based on the content page retrieved by the intermediary system;
      generating a first emulated control based on the first information, wherein the first emulated control emulates the first control included in the first portion of the content page as retrieved by the intermediary system;

positioning the first emulated control over a corresponding image of the first control in the first graphical representation of the first portion of the content page;
causing the first graphical representation of the first portion of the content page and the first emulated control to be presented to a user;
subsequent to the presentation of the first graphical representation and the first emulated control to the user, receiving second information for a second control included in a second portion of the content page; and
generating a second emulated control based on the second information after the first graphical representation and the first emulated control are presented to the user, wherein the second information is provided by the intermediary system based on the content page retrieved by the intermediary system,
wherein at least the generation of the first emulated control and the positioning of the first emulated control are performed by a user device.

10. The method of claim 9, wherein the first information comprises a control type and a location of the first control in the content page.

11. The method of claim 9, wherein positioning the first emulated control comprises positioning the first emulated control based on the first information.

12. The method of claim 9, further comprising:
receiving input representing an interaction with the first emulated control;
providing the input and an identifier of the first control to the intermediary system, wherein the first control corresponds to the first emulated control;
receiving an updated graphical representation of at least a portion of the content page; and
replacing at least a portion of the first graphical representation presented to the user with the updated graphical representation.

13. The method of claim 9, further comprising:
receiving input representing an interaction with the first emulated control; and
causing a modified form of the first emulated control to be presented to the user in response to the input without communicating with the intermediary system.

14. The method of claim 9, wherein the intermediary system comprises a proxy server.

15. The method of claim 9, wherein the first control, the second control, the emulated first control, and the emulated second control each comprise at least one of the following: a checkbox, a radio button, a drop-down, a text box, a button, a spinner, a list box, a combo box, a tooltip, a slider, and a scroll bar.

16. The method of claim 9, further comprising:
including the first emulated control in a first overlay layer, wherein the positioning the first emulated control over the corresponding image of the first control comprises positioning the first overlay layer over the first graphical representation of the content page such that the first emulated control is over the corresponding image of the first control.

17. The method of claim 16, further comprising:
receiving updated information for the first control;
generating an updated first emulated control based on the updated information; and
including the updated first emulated control in a new overlay layer, wherein the new overlay layer replaces the first overlay layer.

18. The method of claim 16, further comprising:
generating a second overlay layer that includes the second emulated control; and
positioning the second overlay layer over the first overlay layer such that the second emulated control is over a corresponding image of the second control in a second graphical representation of the second portion of the content page.

19. A system for emulating content controls for a content page, the system comprising:
a user computing device comprising computer hardware, the user computing device configured to receive a graphical representation of a content page and to:
receive first information for a first control included in a first portion of the content page;
generate a first emulated control based on the first information;
position the first emulated control based on the first information over a first graphical representation of the first portion of the content page;
cause the first emulated control to be presented on a display of the user computing device with the first graphical representation of the first portion of the content page;
receive second information for a second control included in a second portion of the content page; and
generate a second emulated control based on the second information after the first graphical representation and the first emulated control are presented on the display of the user computing device.

20. The system of claim 19, wherein the first information comprises at least a control type and a location of the first control within the content page.

21. The system of claim 19, wherein the first emulated control is transparent to a user.

22. The system of claim 19, wherein the user computing device is further configured to:
capture input received with respect to the first emulated control; and
provide the input and identification information for the first control to an intermediary system, wherein the user computing device is further configured to:
receive an updated graphical representation of at least a portion of the content page; and
replace at least a portion of the first graphical representation of the content page with the updated graphical representation.

23. The system of claim 19, wherein the user computing device is further configured to:
capture input received with respect to the first emulated control; and
modify a presentation of the first emulated control on the display in response to the input.

24. The system of claim 19, wherein the user computing device is further configured to:
receive the first graphical representation of the content page;
cause the first graphical representation of the content page to be presented on the display;
receive an updated graphical representation of at least a portion of the content page responsive to an input received with respect to the first emulated control; and
cause the updated graphical representation to be presented on the display in place of at least a portion of the first graphical representation of the content page.

* * * * *